United States Patent [19]
Ahearn et al.

[11] Patent Number: 5,801,918
[45] Date of Patent: Sep. 1, 1998

[54] ERGONOMIC HOUSING FOR A MICRO COMPUTER

[75] Inventors: Kevin J. Ahearn, Matthews; Lawrence R. Ober, Pineville; Michiel Reinier Ausems, Charlotte, all of N.C.

[73] Assignee: Hand Held Products, Inc., Charlotte, N.C.

[21] Appl. No.: 679,307

[22] Filed: Jul. 12, 1996

[51] Int. Cl.⁶ .................. G06F 1/16; H05K 5/02
[52] U.S. Cl. ............................ 361/683; 235/472
[58] Field of Search ................. 361/683, 684, 361/686, 729, 731; 364/708.1; 235/472, 462; D14/101, 107; G06F 1/16

[56] References Cited

U.S. PATENT DOCUMENTS

| | | |
|---|---|---|
| D. 248,946 | 8/1978 | Koenig . |
| D. 258,956 | 4/1981 | Chadima, Jr. . |
| D. 274,249 | 6/1984 | Polhemus . |
| D. 293,795 | 1/1988 | Yamamoto . |
| D. 297,430 | 8/1988 | Beard et al. . |
| D. 297,431 | 8/1988 | Beard et al. . |
| D. 297,432 | 8/1988 | Stant et al. . |
| D. 308,865 | 6/1990 | Weaver et al. . |
| D. 315,901 | 4/1991 | Knowles . |
| D. 331,576 | 12/1992 | Yamanaka . |
| D. 340,034 | 10/1993 | Hofstetter et al. . |
| D. 340,707 | 10/1993 | Swartz . |
| D. 341,584 | 11/1993 | Shepard et al. . |
| D. 341,838 | 11/1993 | Kasch et al. . |
| D. 342,256 | 12/1993 | Payne et al. . |
| D. 352,704 | 11/1994 | Etoh . |
| D. 352,935 | 11/1994 | Etoh . |
| D. 353,134 | 12/1994 | Etoh . |
| D. 355,904 | 2/1995 | Swartz et al. . |
| D. 359,040 | 6/1995 | Nakamura et al. . |
| D. 363,287 | 10/1995 | Laituri . |
| D. 366,043 | 1/1996 | Hara et al. . |
| D. 366,044 | 1/1996 | Hara et al. . |
| D. 366,876 | 2/1996 | Labohm . |
| D. 367,060 | 2/1996 | Augaitis et al. . |
| D. 372,245 | 7/1996 | Brooks . |
| D. 372,246 | 7/1996 | Renk et al. . |
| 4,335,303 | 6/1982 | Call . |
| 4,570,057 | 2/1986 | Chadima, Jr. et al. . |
| 4,694,182 | 9/1987 | Howard . |
| 4,801,786 | 1/1989 | Stobbe . |
| 4,818,847 | 4/1989 | Hara et al. . |
| 4,818,856 | 4/1989 | Matsushima et al. . |
| 4,841,129 | 6/1989 | Tawara et al. . |
| 4,930,848 | 6/1990 | Knowles . |
| 5,046,739 | 9/1991 | Reichow .............. 273/148 B |

(List continued on next page.)

FOREIGN PATENT DOCUMENTS

| | | |
|---|---|---|
| 0354814 | 2/1990 | European Pat. Off. . |
| 0531645 | 3/1993 | European Pat. Off. . |
| 0565290 | 10/1993 | European Pat. Off. . |
| 2561949 | 10/1995 | France . |
| 11373/89 | of 0000 | Japan . |

OTHER PUBLICATIONS

International Search Report of PCT/US 96/08352, completed Oct. 24, 1996 by Y. Gelebart.

Hand–Held Laser Scanner, Symbol Technologies, Inc. Brochure dated at least one year prior to Jul. 12, 1996.

Telxon Puts New Spin on Handheld Computers, Technology Update, Mar. 12, 1996.

Welcome to Symbol Technologies, Inc., Mar. 12, 1996.

*Primary Examiner*—Lynn D. Feild
*Attorney, Agent, or Firm*—Bell Seltzer Intellectual Property Law Group of Alston & Bird LLP

[57] ABSTRACT

An ergonomic housing for a micro computer which has an upper surface for positioning interface components thereon and a lower surface having a front portion and a rear portion. A finger saddle is defined between the front portion and the rear portion for receiving an operator's finger therein and enabling the micro computer housing to be comfortably held in an operator's hand when the operator's hand is in its naturally relaxed position.

68 Claims, 6 Drawing Sheets

U.S. PATENT DOCUMENTS

| | | |
|---|---|---|
| 5,081,343 | 1/1992 | Chadima, Jr. et al. . |
| 5,187,354 | 2/1993 | Bengtsson . |
| 5,202,817 | 4/1993 | Koenck et al. ............ 361/680 |
| 5,237,162 | 8/1993 | Harden et al. . |
| 5,264,956 | 11/1993 | Tzu-Chin . |
| 5,281,801 | 1/1994 | Shepard et al. . |
| 5,288,984 | 2/1994 | Ino et al. . |
| 5,288,985 | 2/1994 | Chadima et al. . |
| 5,291,009 | 3/1994 | Roustaei . |
| 5,410,141 | 4/1995 | Koenck et al. ............ 235/472 |
| 5,424,525 | 6/1995 | Rockstein et al. . |
| 5,430,284 | 7/1995 | Numazaki . |
| 5,432,510 | 7/1995 | Matthews ................ 341/20 |
| 5,477,042 | 12/1995 | Wang . |
| 5,479,001 | 12/1995 | Kumar .................. 235/472 |
| 5,481,265 | 1/1996 | Russell ................. 341/22 |
| 5,489,770 | 2/1996 | Kadota et al. . |
| 5,616,906 | 4/1997 | Kumar .................. 235/462 |

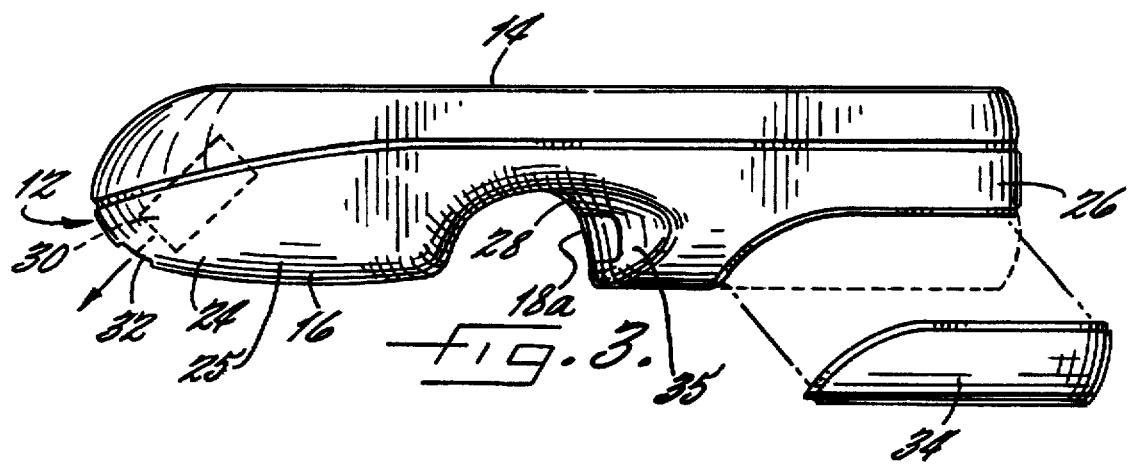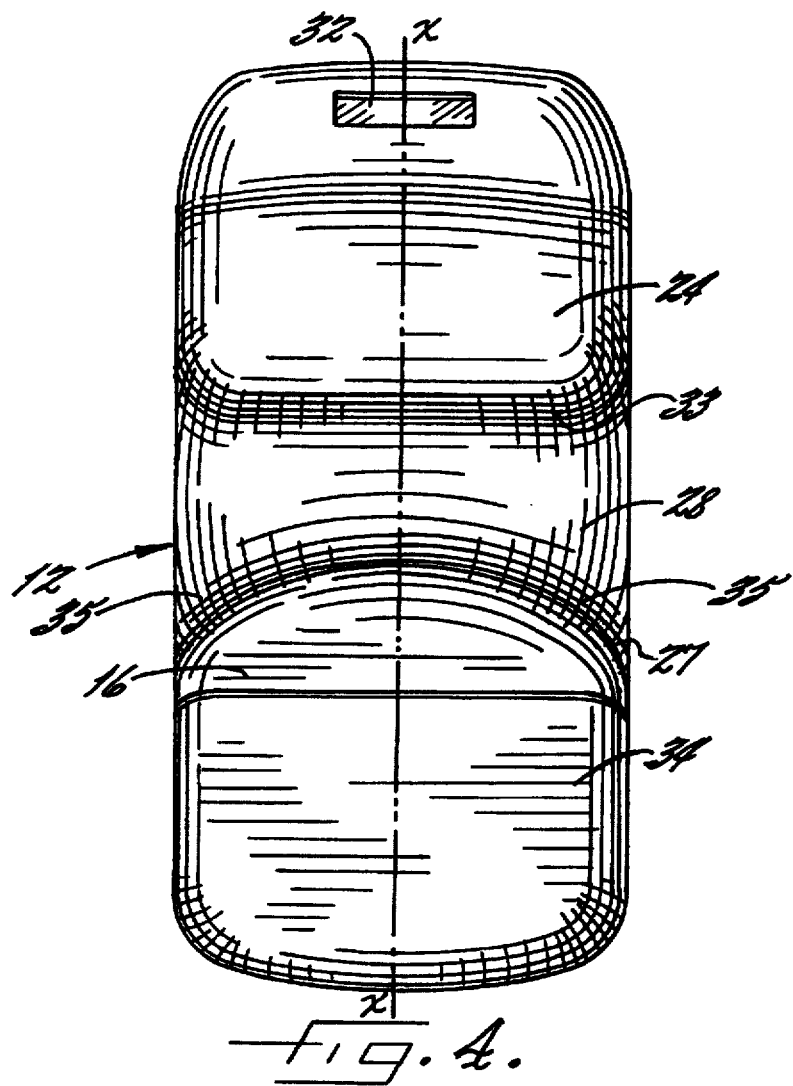

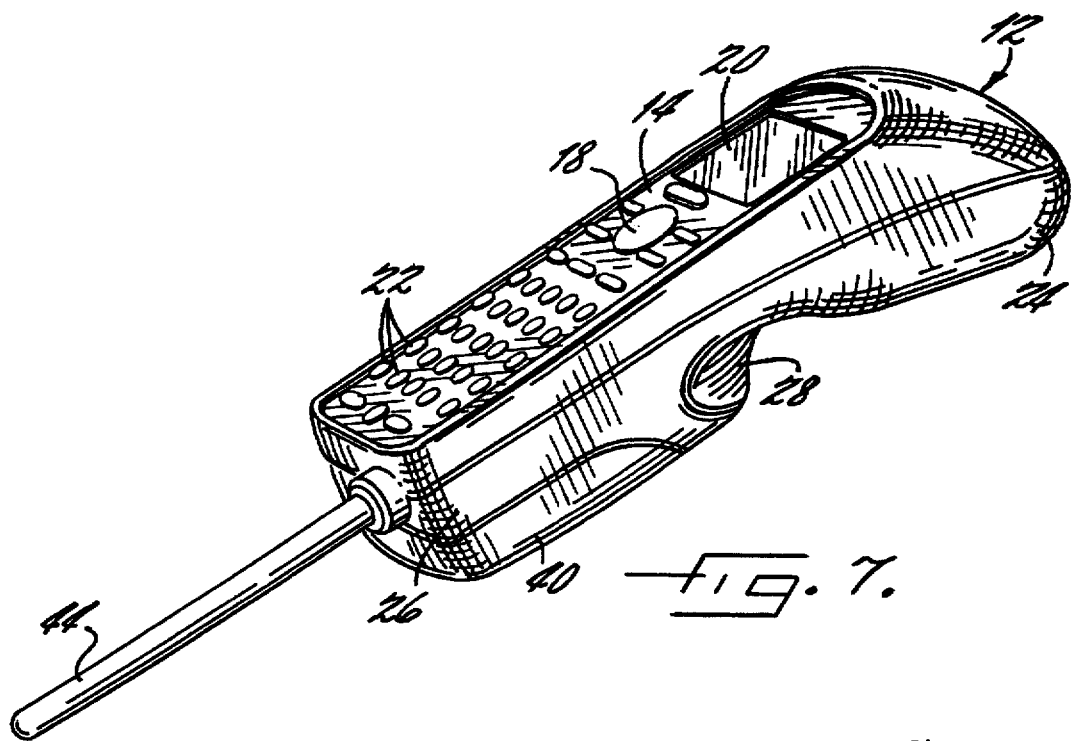
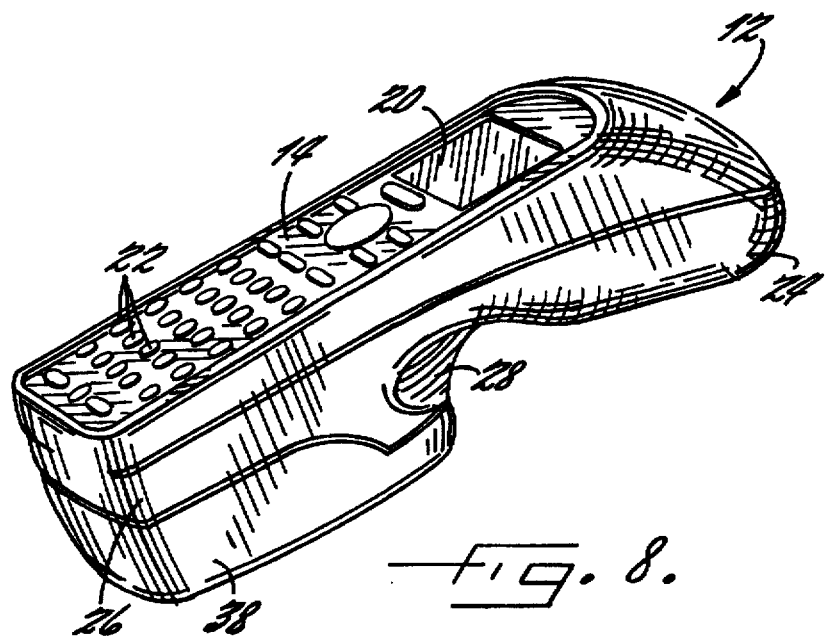

ERGONOMIC HOUSING FOR A MICRO COMPUTER

FIELD OF THE INVENTION

The present invention relates to micro computers and, more particularly, to an ergonomic housing for a micro computer.

BACKGROUND OF THE INVENTION

Optical scanners for reading universal product codes or bar codes and remote control units for controlling electronic equipment, such as televisions and stereos have become commonplace in everyday life. Improvements in micro computer technology have allowed micro computers to shrink in size, which has increased the role micro computers play in today's world. Micro computers which can send and record data, optically or by radio frequency or other means, to track inventory and/or the location of equipment or packages have become an important instrument in several industry sectors. The success of the micro computer in performing these tasks and continual improvements in technology suggest that the role of micro computers will continue to expand in the modern world.

Unfortunately, as with most technological advances, problems have begun to arise because of the incorporation of micro computers into new and unexpected areas of our daily lives. One such problem has been to combine the conflicting requirements of form or ergonomics, function, and aesthetics of the micro computer housing. These elements were largely ignored in the shape of the original micro computers. Traditionally the shape of the housing was determined primarily on fitting the components of the micro computer into as small an area as possible. The result was a generally square or rectangular housing which was unappealing, difficult to hold, awkward to operate, and required a great deal of hand and wrist manipulation.

However, with the recent awareness of injuries that may be associated with repetitive motion, and the desire to have a comfortable housing, ergonomic considerations have become an essential factor in determining the shape of the micro computer housing. As a result, manufacturers have attempted to develop a micro computer housing which successfully combines ergonomic, functional, and aesthetic considerations. The ergonomic component of the desired micro computer has lead manufacturers to modify the shape of the housing to make it fit an operator's hand more comfortably.

Early attempts at improving the ergonomics of the housing were little more than rounding the edges of the housing to make it less blunt, while retaining its generally rectangular shape. Subsequently, the front or head of the housing, i.e., the portion adjacent an optical scanner or transmitter, was bent or angled downward in an attempt to minimize the planar flexion of the operator's hand when holding the housing. Examples of micro computer housings having this shape may be seen in U.S. Pat. Nos. 5,187,354 to Bengtsson, and 4,335,303 to Call.

Another approach adopted to make the housing more comfortable has been to make the head of the housing larger than the center or waist portion thereof. This housing shape has been used with both generally planar housings and with housings having a downwardly angled head portion. Examples of micro computers having this shape are disclosed in U.S. Pat. Nos. D341,584 to Shepard et al., D353,134, D352,935, and D352,704 to Etoh, and 5,430,284 to Numazaki.

A similar approach has been to give the housing a generally hour glass shape so as to leave the waist portion of the housing somewhat narrower. Examples of the housing having a generally hour glass shape may been seen in U.S. Pat. Nos. 4,818,856 to Matsushima et al., 4,818,847 to Hara et al., D367,060 to Augaitis et al., D342,256 to Payne et al., D340,034 to Hofstetter et al., D293,795 to Yamamoto, and D341,584 to Shepard et al.

A second focus of manufacturers, closely related to the shape of the micro computer housing, has been to vary the location of the data aperture of the micro computer. Traditionally, the data aperture was located at the head or front portion of the housing and could operate only if pointed directly at the target. Examples of such a design made be found in U.S. Pat. Nos. D363,287 to Laituri, and D341,838 to Kasch et al. As set forth above, bending or angling the head portion of the housing permits the operator to more easily align the optical aperture with the target because the operator's hand and wrist are in a more natural position. More recently, the PTC-930 ErgoScan micro computer, manufactured by Telxon, introduced the use of a housing having a rotating head to allow the operator to interact with the desired target either from the side, the back, or the front.

An additional factor in making a micro computer more functional and user friendly, has been to vary the location of the primary activation buttons or switches. Traditionally, the micro computer was in a constant ON mode, such as optical bar code scanners. An example of this type of micro computer is disclosed in U.S. Pat. Nos. 5,489,770 to Kadota et al. A switch located either on the top or the bottom of the housing may also be used to activate the micro computer to receive and/or send data. U.S. Pat. Nos. 5,288,985, 5,081,343, and 4,570,057 to Chadima, Jr. et al., 5,237,162 to Harden et al., and U.S. Pat. Nos. 4,930,848 and D315,901 to Knowles each disclose such a device.

Alternatively, improved ergonomic operation of the micro computer has been attempted by moving the location of the activation switch to the side of the housing. This arrangement of side activation switch is normally found on housings which have a waist portion which is narrower than the head portion. Examples of this type of micro computer are disclosed in U.S. Pat. Nos. D331,576 to Yamanaka and 5,477,042 to Wang.

In conjunction with locating the activation switches, another consideration has been the location and relationship of the keypad and/or the display relative to the location of the activation switch and the overall shape of the housing. As micro computers have become more powerful, the tasks which they perform have become more complex necessitating the inclusion of a display and/or a keypad. The placement of the keypad and/or the display have an effect on the ergonomics, function, and aesthetics of the micro computer. Typically, the keypad and/or display and the activation switch have been located adjacent to each other either on the upper surface or the lower surface of the micro computer housing. For example, U.S. Pat. Nos. D366,043 and D366,044 to Hara et al., and the PDT 2100 micro computer manufactured by Symbol, each disclose such a device.

Despite all these approaches to manufacturing micro computers, existing micro computers have been unable to successfully manufacture a micro computer having a housing which is truly ergonomic, functional, and aesthetically appealing.

SUMMARY OF THE INVENTION

In view of the foregoing background, it is therefore an object of the present invention to provide a housing for a micro computer which is not only ergonomic but also functional and aesthetically appealing.

These and other objects, features, and advantages of the present invention are obtained by providing an ergonomic housing for a micro computer having an upper surface for positioning interface components thereon and a lower surface having a front portion and a rear portion. A finger saddle is defined between the front portion and the rear portion for receiving an operator's finger therein, enabling the micro computer housing to be comfortably held in an operator's hand when the operator's hand is in its naturally relaxed position.

The ergonomic features incorporated into existing micro computer housings do not incorporate features directed to the contours of an operator's hand when in its naturally relaxed anatomical position. Applicant has determined that much of the fatigue associated with using micro computers is that existing housings require the operator to grasp the housing in an unnatural manner and/or frequently move his or her hand to operate the device. In addition, existing micro computer housings require the user to grasp or squeeze the housing to retain the housing in the desired position in order to manipulate the activation switch. Applicant's device overcomes many of these problems, by changes to the shape of the housing, including a channel which bisects the front portion and rear portion of the housing generally perpendicular to a longitudinal axis thereof.

Preferably the finger saddle has a generally inverted U-shaped configuration when seen from the side, i.e., perpendicular to the longitudinal axis of the housing. In addition, it is beneficial for the finger saddle to also have a generally inverted U-shaped configuration in a second direction generally parallel to the longitudinal axis of the housing. This second inverted U-shape allows the finger saddle to gradually taper into the sides of the housing thereby enabling the finger saddle to comfortably receive at least one finger therein and help in limiting unwanted relative movement of the housing and an operator's hand. The finger saddle cooperates with the operator's hand so well that the housing actually comfortably perches on the operator's finger when held. This ability of the housing to perch on the operator's finger, when held at an angle of approximately between 0° and 50° from the horizontal, allows the operator to manipulate the interface component(s) without requiring any additional pressure or squeezing of the housing to be applied by those fingers not located in the finger saddle. Consequently, the finger saddle of the present invention helps to reduce fatigue usually associated with holding existing micro computer housings.

The finger saddle also enables the housing to be selectively held in a first position wherein the upper surface of the housing is in a plane generally perpendicular to an operator's palm, and be selectively held in a second position wherein the upper surface of the housing is in a plane generally parallel with an operator's palm, as well as anywhere in between.

The front portion and the rear portion of the housing desirably combine to form a generally planar base which allows the housing to be positioned on a substantially planar surface such as a table or counter and be used much like a calculator. Similarly, the upper surface of the housing has a peripheral ridge which thereby recesses both the interface components located on the upper surface thereof and/or a display screen located thereon. Consequently, the device can readily be placed on either the planar base or the upper surface without damaging any components thereof.

It is desirable for one of the interface components mounted on or connected to the upper surface of the housing to be an activation switch which can be used to selectively activate and deactivate the micro computer. The activation switch is advantageously within an area in general axial alignment with the finger saddle so as to allow an operator to activate the activation switch by natural opposed flexion of an operator's thumb and/or flexion of an operator's finger positioned within the finger saddle. Because of this opposed movement of the operator's thumb and finger, the finger saddle beneficially limits relative movement between the operator's hand and the housing.

The upper surface of the housing is also preferably provided with a thumb pad or rest adjacent the activation switch. The thumb pad allows the operator to comfortably rest his/her thumb on the pad while holding the housing in the desired position. By being able to rest the operator' thumb on the thumb pad, the operator avoids placing his/her thumb on the display screen causing unwanted scratches and smudges making information displayed thereon harder to read. In addition, use of the thumb pad minimizes inadvertent engagement of the activation switch which may cause unwanted scanning of data and overuse of and damage to the activation switch.

Typically the finger saddle is positioned in the central area of the housing so as to receive an operator's finger. However, as is readily appreciated by those skilled in the art to which the invention relates, the finger saddle may be moved more rearwardly to allow the hand to be repositioned relative to the housing or to advantageously receive a finger other than the index finger. In addition, it may in certain situations be desirable to provide two or more parallel finger saddles and/or have a larger finger saddle to accommodate two or more fingers therein, provided that this larger finger saddle has a similar overall configuration as that disclosed herein.

In some instances, it is beneficial to provide the upper surface of the housing with as much surface area as possible to receive a display and a key pad. In such situations, it is preferred that the upper surface have a generally rectangular configuration when in top plan view. It is also desirable for the upper surface to be generally planar along at least a portion thereof to position the key pad. A desirable alternative embodiment of the housing is to provide an upper surface which is adapted for allowing the lower surface to receive a mechanical and/or an electrical interface.

In order to make the housing more ergonomic and user friendly, it is preferred that the front portion of the housing have a downwardly diverging angle transverse to the longitudinal axis of the housing. This angled front portion in conjunction with a data aperture formed therein allows the operator to easily interact with the desired target without having to excessively manipulate his wrist and hand or squeeze the housing other than the opposed movement necessary of the thumb and the finger located in the finger saddle to operate the activation switch.

The angled front portion also provides the operator with an unobstructed view of the desired target to enable easier location of the area to be scanned. In conjunction with the angled shape of the front portion, the aperture for the optical scanner is recessed into the housing so that the front portion acts as a bumper to prevent the aperture from being damaged if the micro computer inadvertently engages the desired target or otherwise engages a solid object.

The angled front portion also has a significant benefit in improving the ease in which the housing fits into an operator's pocket and/or holster. The rounded or bulbous shape of the front portion helps the housing slide easily into a pocket or holster without any undue force. This shape, in conjunction with the peripheral ridge surrounding the upper surface of the housing, enables the housing to easily slip into a pocket or holster without catching on anything or damaging any components of the micro computer.

Similarly, when the housing is turned on its back and placed in a pocket, the finger saddle helps to retain the micro computer safely within the pocket. This is especially true for use in more tightly fitting trousers (e.g. jeans) with tight pockets that normally can not be used for carrying a device of this size in a comfortable way. The advantage of using the invention in this manner is that only the front half of the device has to be stuck in the trouser pocket, thereby allowing the remainder of the device (i.e., the handle) to protrude out of the pocket. This positioning of the device greatly improves the speed with which it can be "grabbed" or removed from the pocket.

The present invention also includes a selectively removable portion which provides the micro computer with the opportunity to connect selectively interchangeable accessory modules which can, for example, increase the capacity, use time, or configuration of the micro computer. In conjunction with the advantage of the housing being modular, it is beneficial if the housing is formed from a clam-shell configuration which provides the housing with a desirable ability to quickly interchange broken or damaged parts thereof.

The housing of the present invention may be textured to provide a tackiness or non-slip characteristic thereto. This textured housing regardless of whether provided on a hard shell or a somewhat softer, i.e., rubber-like material enhances the comfort and improves the ergonomics of the housing.

BRIEF DESCRIPTION OF THE DRAWINGS

In the drawings which form a portion of the original disclosure of the invention:

FIG. 3 is side view, partially in phantom, illustrating the micro computer housing with a removable portion thereof removed;

FIG. 4 is a bottom plan view illustrating the micro computer shown in FIG. 2;

FIG. 7 is a side view in perspective illustrating still another alternative embodiment of the micro computer shown in FIG. 1 having an antenna;

FIG. 8 is a side view in perspective illustrating a different embodiment of the micro computer shown in FIG. 1 having an accessory module connected thereto;

DETAILED DESCRIPTION OF THE INVENTION

Figure 1:
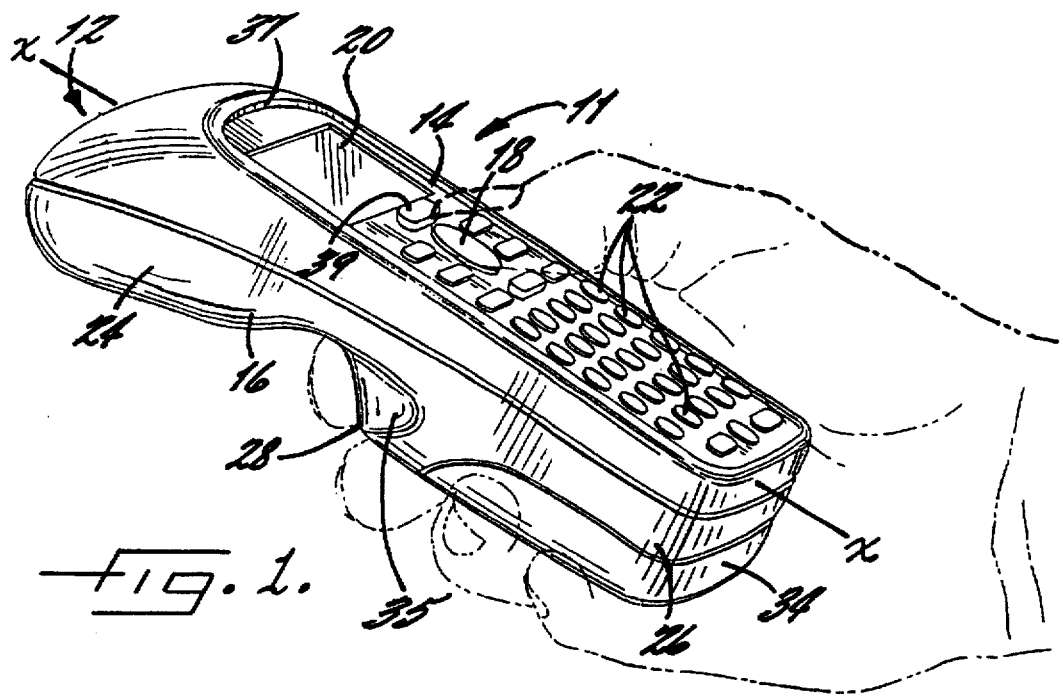
FIG. 1 is a side view in perspective illustrating a micro computer having an ergonomic housing in accordance with the present invention, being comfortably held in an operator's hand.
Figure 2:
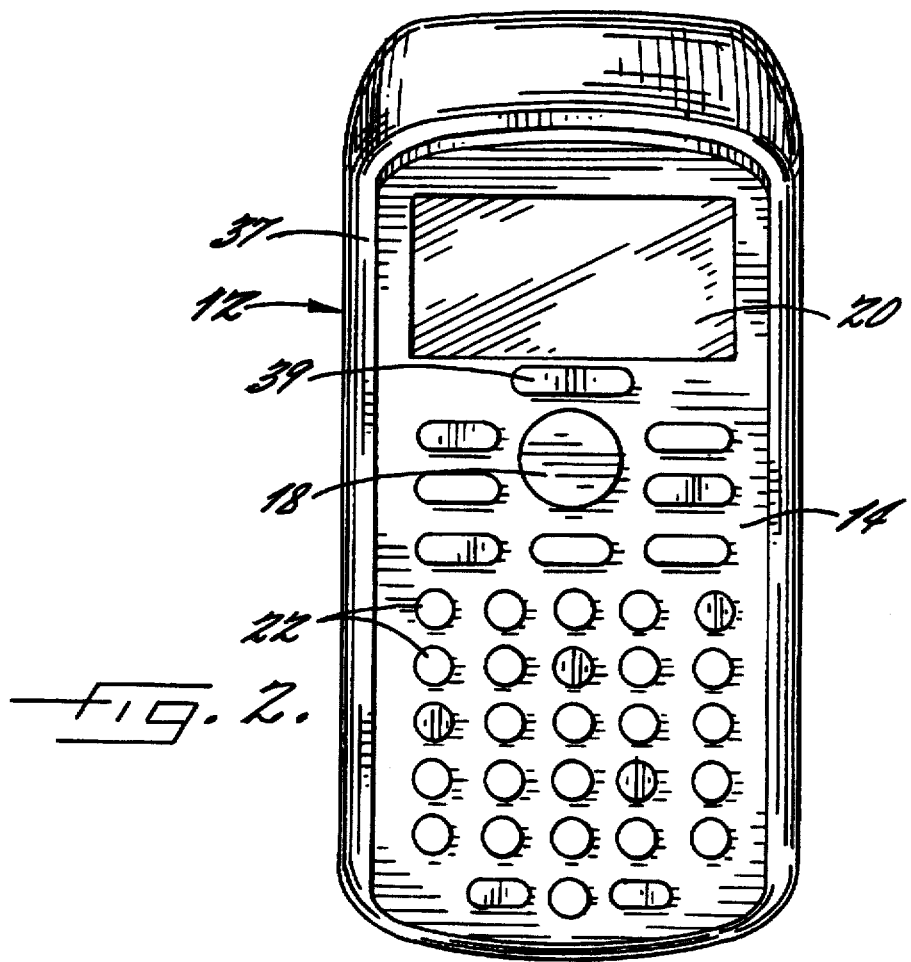
FIG. 2 is a top plan view illustrating the micro computer shown in FIG. 1.

The present invention now will be described more fully hereinafter, in which the preferred embodiments of the invention are set forth. This invention may however, be embodied in many different forms and should not be construed as limited to the embodiments described herein; rather, these embodiments are provided so that this disclosure will be thorough and complete, and will fully convey the scope of the invention to those skilled in the art to which this invention relates.

Referring more particularly to the drawings, FIGS. 1 through 4 illustrate a first embodiment of a micro computer, generally indicated as 11, according to the present invention. In the embodiment shown, the micro computer 11 has a generally rectangular housing, generally indicated as 12, which both protects the internal components of the micro computer from the elements and abuse associated with use of the micro computer, and determines the ergonomic and functional interaction with the operator. The housing 12 is also an important factor in the overall aesthetics or stylistic appeal of the micro computer 11.

The housing 12 has an upper surface 14 and a lower surface 16. As shown best in FIGS. 2 and 3, the upper surface 14 of this embodiment has a generally rectangular configuration in top plan view, and has a generally planar upper-most surface. The generally rectangular configuration is desirable in order to provide the largest possible surface area for positioning interface components thereon, such as an activation switch 18 and/or a display 20, and/or a key pad 22. It is to be understood however that the shape of the upper surface 14 may be widely varied both in top plan view and in side view and still be within the intended scope of the invention. For example, the upper surface may have an upwardly or downwardly arcuate shape in order to vary the aesthetics of the housing or to accommodate positioning of one or more of the interface components and/or the components contained within the housing.

As shown in FIGS. 1 and 3, the housing 12 has a front portion 24 and a rear portion 26. In between the front portion 24 and the rear portion 26 of the housing 12 is formed a finger saddle 28. As shown, the finger saddle 28 has a generally U-shaped configuration which forms a channel across the housing 12 generally perpendicular to a longitudinal axis X of the housing, so as to separate the front portion 24 and the rear portion 26. The finger saddle 28 also has a second U-shaped configuration formed by surface 27 which is parallel to the longitudinal axis of the housing 12 and conforms to the natural contour of an operator's relaxed finger.

Figure 11:
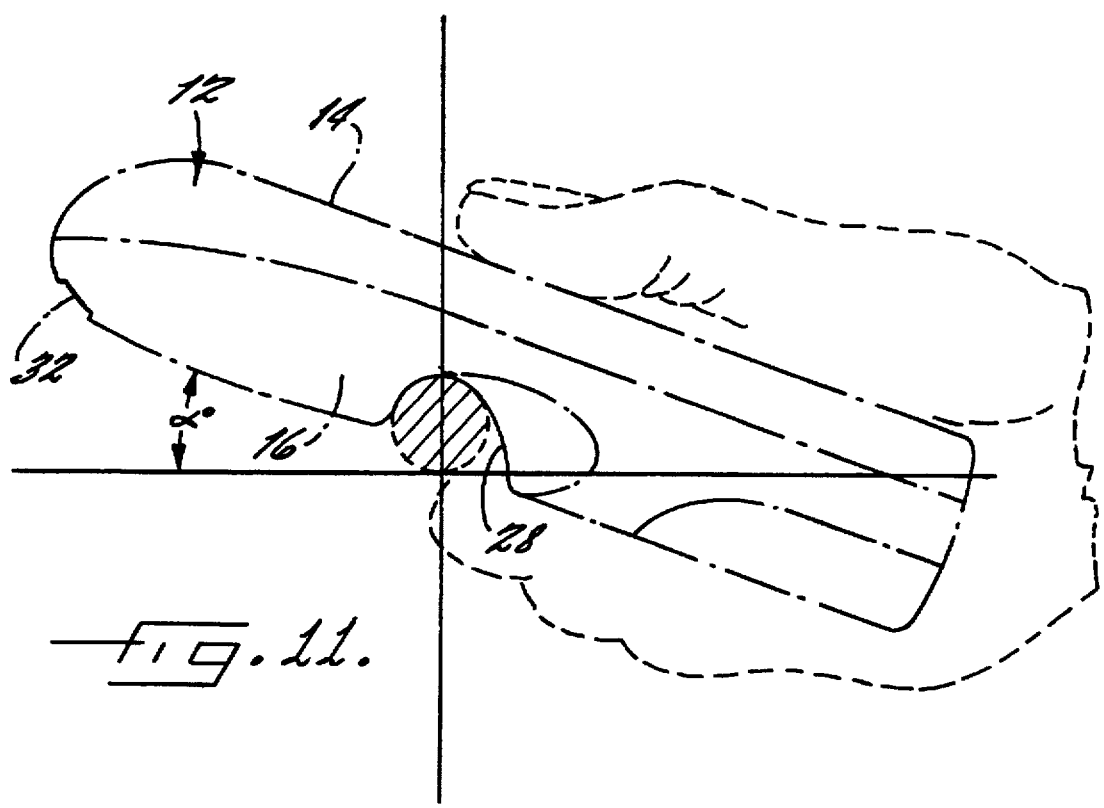
FIG. 11 is a side view of the housing showing a hand of the operator in phantom as it engages the finger saddle according to the present invention.

Although the finger saddle 28 can function according to the present invention without the second U-shaped configuration, the combination of the two aspects, i.e., U-shaped configurations, of the finger saddle allows the finger saddle to comfortably receive an operator's finger when the hand of the operator is in its naturally relaxed position. The aspect of the U-shaped configuration which is parallel to the longitudinal axis X of the housing 12 allows the finger saddle 28 to be tapered along the sides of the housing to provide beveled portions 35, making the interaction between an operator's hand and the housing more comfortable. FIGS. 1, 4, 9, and 11 clearly illustrate how the finger saddle 28 readily conforms to the contour of a relaxed finger while providing a stop surface 33 proximate the outside of an operator's finger to limit unwanted movement of the housing 12 relative to an operator's hand during activation or operation of one or more of the interface components. As best shown in FIG. 11, the shape of the finger saddle 28 also enables the housing 12 to be perched or locked onto the operator's finger located within the finger saddle when the housing comfortably positioned at an angle of approximately between 0° and 50° relative to the horizon, i.e., the naturally relaxed position of the operator's hand. This ability of the housing to perch on the operator's finger at an almost natural balance point for the housing 12, enables the operator to obtain the desired data from the desired target without requiring the operator to firmly grasp or squeeze the housing with the remaining fingers of the hand. As a result, this ergonomic feature of the housing 12 of the present invention helps to reduce hand and wrist fatigue, thereby improving the overall comfort of the housing.

The front portion of the upper surface 14 of the housing 12 has a generally downwardly diverging arcuately shaped configuration or droop. It is to be understood that the shape of the front portion of the upper surface 14 of the housing 12 may vary depending on a large number of factors and still remain with the intended scope of the invention.

In the embodiment shown in FIGS. 1–4, the shape of the front portion 24 of the lower surface 16 of the housing 12 is somewhat bulbous and defines an interior cavity 25 for receiving at least a portion of the micro computer components to be housed within the housing. For example, as shown in phantom in FIG. 3, a scan engine 30 is illustrated by way of an example of the type of component that may be housed within the front portion 24 of the housing. The front portion 24 of the housing 12 defines an aperture 32, such as an optical aperture, which in the embodiment shown, cooperates with the scan engine 30 to allow the signal, in this case an optical signal, to interact with the desired target. Because of the downwardly angled shape of the front portion of the upper surface 16 and the location of the aperture 32, an operator can easily interact with the desired target, such as a package, not shown, without much movement of the operator's hand. In addition, this shape of the front portion of the upper surface 16 allows the operator an unobstructed view of the desired target, which helps to reduce unwanted movement of the operator's hand. In the present embodiment, the angle of the front portion of the upper surface 16 approaches 45° from the horizontal. It is to be understood however that this angle may vary a great deal, depending on the intended use of the micro computer and/or the individual needs of the user, and still remain within the spirit of the present invention.

The front portion of the lower surface 16 defines a recess for the aperture 32 in order to protect it from damage if the front portion of the upper surface inadvertently engages the desired target or otherwise engages a hard surface, such as a floor or wall. That portion of the housing surrounding the aperture 32 acts as a bumper to protect it from damage.

The rear portion 26 of the lower surface 16 has a generally rectangular configuration which also forms a cavity 31 for receiving at least a portion of the micro computer 11 components to be placed within the housing 12. The depth i.e., size of the rear portion 26 of the housing 12 will depend on the size and number of components to be placed therein.

Figure 5:
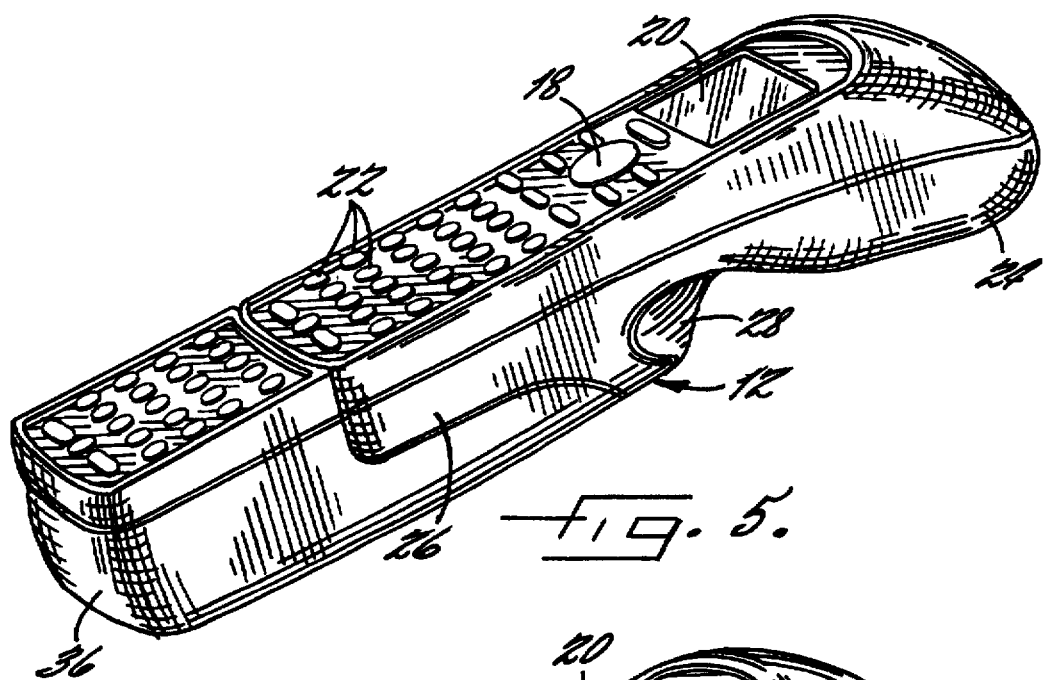
FIG. 5 is a side view in perspective illustrating an alternative embodiment of the micro computer shown in FIG. 1 having an accessory module in the form of an additional keypad connected to the housing.
Figure 9:
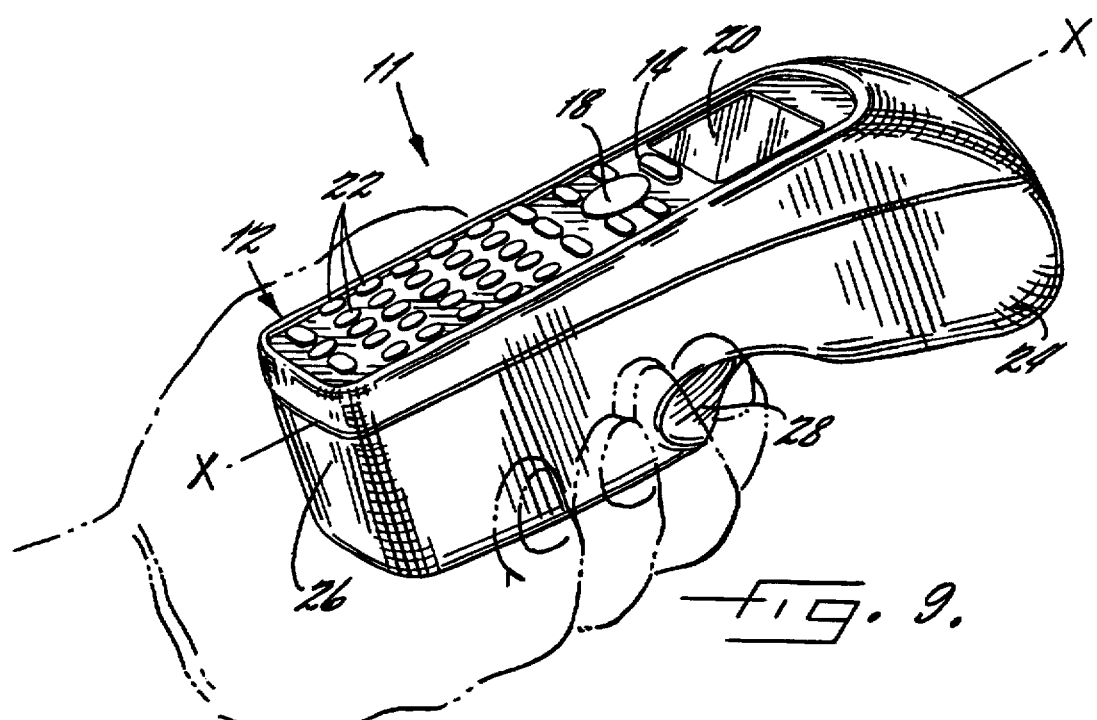
FIG. 9 is an opposed side view in perspective of a further embodiment of the micro computer shown in FIG. 1 being held in an operator's hand.

At least FIGS. 5, 7, and 9 illustrate the fact that the front portion 24 and the rear portion 26 of the lower surface 16 are both generally planar to provide a stable base for the micro computer housing 12 when placed on a substantially planar surface. In this position, the micro computer, assuming the embodiment being used contains a keypad 22, may be operated much like a calculator. As is readily understood by those skilled in the art to which this invention relates, the housing 12 need only have either the front portion 24 or the rear portion 26 have a substantially planar lower surface.

In the embodiments shown in FIGS. 1, 3, and 5 through 8, the housing 12 has a generally clam-shell configuration. In each of these embodiments, the rear portion 26 of the lower surface 16 has a removable portion 34. As shown, the removable portion 34 allows the housing 12 to receive an accessory module, such as an expanded keypad 36 (shown in FIG. 5), an expanded memory 38 (shown in FIG. 8), an auxiliary battery 40 (shown in FIG. 7), or a pistol grip 42 (shown in FIG. 6). The ability of the housing 12 to accommodate the above examples of an accessory module greatly expands the use and versatility of the micro computer 11. It is to be understood that several other accessory modules may be used in conjunction with the housing while remaining within the spirit of the present invention. It is also further understood that the removable portion 34 of the housing 12 may be incorporated into a housing design other than the clam-shell configuration disclosed. For example, the housing 12 may be a single unit having a removable panel 34 which also provides access to one or more of the cavities 29 and 31 of the housing for repair and/or replacement of the components contained therein. These items may also be contained in a housing 12 having a deep lower surface 10 such as that shown in FIG. 9, without departing from the spirit of the invention.

As shown in FIGS. 1, 9, and 11, the use and shape of the finger saddle 28 allows the housing 12 to fit comfortably within the contours of a relaxed hand of an operator in at least two different positions. In the position shown in FIG. 1, the upper surface 14 of the housing 12 is in a plane generally perpendicular to a palm of an operator's hand. Note that the upper surface 16 has a ridge 37 around the periphery thereof to form a recess to contain and protect the interface components such as the activation switch 18, the display screen 20, and the keypad 22.

In FIG. 9, the upper surface 14 of the housing 12 and the peripheral ridge 37 are in a plane generally parallel to a palm of an operator's hand. Because of the shape of the housing 12 and the finger saddle 28, the operator can comfortably grip and operate the micro computer 11 without extraneous movement or excessive pressure. The location and shape of the finger saddle 28 and She location of the primary activation switch(es) 18 allows for selective activation of the activation switch by natural movement of an operator's thumb and/or finger.

In the embodiments shown in FIGS. 1 and 9, the activation switch 18 is located on the upper surface 14 of the housing 12 in generally opposed axial alignment with the finger saddle 28. In this location, an operator need only rely on the natural opposed flexion of his thumb to activate the micro computer 11. The desired hand position of the operator is maintained by the finger placed within the finger saddle 28, because it provides a stop for the finger which limits unwanted relative movement between the housing 12 and the operator's hand as the micro computer 11 is activated. If the activation switch 18a is located in the finger saddle 28, the operator need only flex his finger, in this embodiment his index finger, to activate the micro computer 11. As discussed above, the finger saddle 28 again limits the relative movement of the housing 12 and the operator's hand during activation. Consequently, the housing 12 remains in the desired and most comfortable position for use.

A thumb pad or rest 39 is positioned adjacent the activation switch 18. The thumb pad 39 is of a shape and size to comfortably receive the fleshy portion of an operator's thumb when the housing 12 is comfortably held in the operator's hand. By positioning the operator's thumb on the thumb pad 39, smudging and/or scratching of the display screen 22 is greatly reduced. In addition, the chance of inadvertent scanning of data is also reduced because the operator's thumb is moved off of and does not rely on the activation switch 18 as a resting place. The thumb pad 39 may also be used for opposed pressure if the activation switch 18a is located in the finger saddle 28.

The location of the aperture 32, the shape of the front portion 24 of the housing 12, and the finger saddle 28 allow the operator to more readily interact with a desired target without having to make excessive movements of the wrist and/or hand. In other words, an operator can maintain the natural anatomical position of his wrist and hand while scanning the bar code of a package or the like because the housing conforms to the natural shape of the hand and the aperture is angled downward toward the desired target, therefore avoiding the need to flex or extend the wrist or manipulate the hand. If desired, the location of the aperture can be varied and the angle of the scan engine can be similarly varied to adjust the angle at which the micro computer can interact with the desired target, for example scan a bar code on a package.

If desirable, it is also possible to provide more than one finger saddle 28 in the lower surface 16 of the housing 12. The additional finger saddles would be positioned in parallel alignment with the first finger saddle. In each of the embodiments shown, the finger saddle 28 is positioned adjacent the middle or center of the housing so as to accommodate an operator's index finger. It is to be understood however, that the location of the finger saddle 28 may be moved to reposition the operator's hand relative to the housing 12 or to receive a different finger if desired, or alternatively, a finger saddle having the same general configuration may be formed to accommodate two fingers, without departing from the spirit of the present invention.

As best shown in FIG. 3, it is to be understood that the U-shaped configuration of the finger saddle 28 is intended to be such that the rear inner edge approaches 90° from the longitudinal axis of the housing 12 to ensure that the finger saddle fulfills its function of limiting relative movement of the housing and the operator's hand. The front inner edge 33 of the finger saddle 28 is configured such that it prevents or limits the housing 12 from moving or slipping out of the operator's hand while the housing is held at an angle of approximately between 0° and 50° from the horizontal as shown in FIG. 11.

Figure 6:
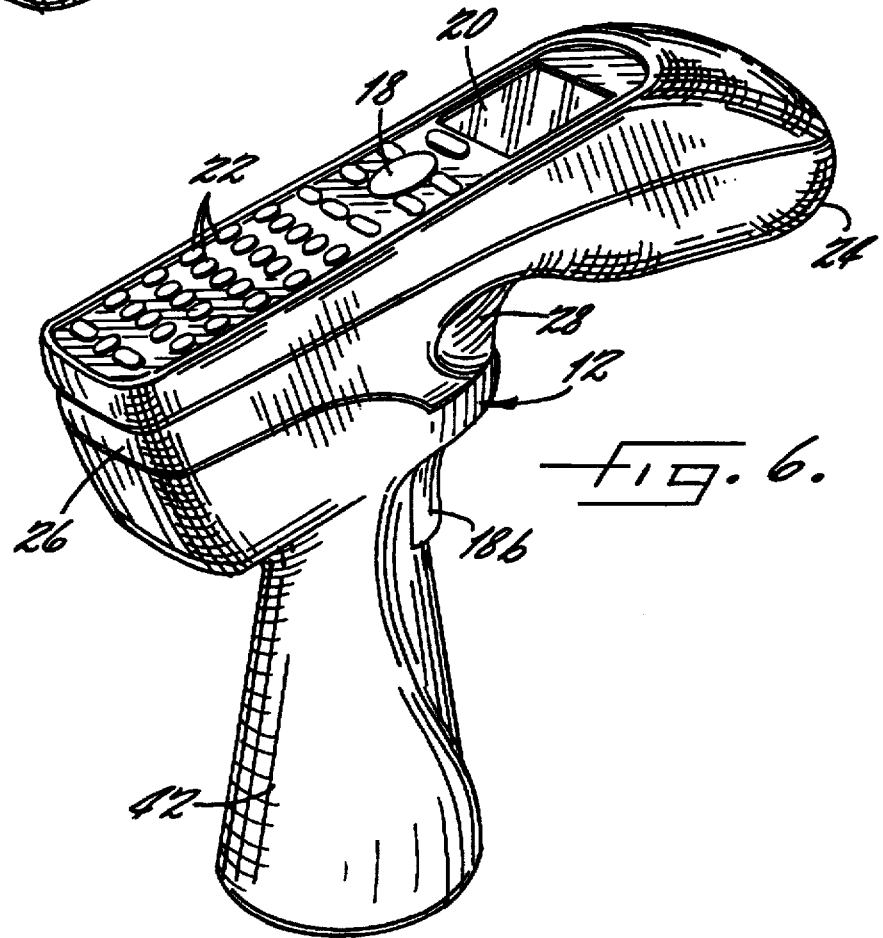
FIG. 6 is a side view in perspective illustrating another alternative embodiment of the micro computer shown in FIG. 1 having a pistol grip connected to the housing.

In the embodiment shown in FIG. 6, the housing 12 has an accessory module in the form of a pistol grip 42 connected thereto. In some instances, it may be desirable to temporarily attach the pistol grip 42 to the housing 12 for alternative uses or applications of the micro computer. In such situations, the ability to remove the removable portion 34 of the housing 12 and connect a pistol grip 42 thereto greatly enhances the versatility of the present invention. In this embodiment, the pistol grip is provided with an auxiliary activation switch 18b which, depending on the use of the micro computer, may operate independent of the primary activation switch 18 or in conjunction therewith. The contour of the pistol grip 42 should be such that it is comfortable to hold and it should provide a stable base for the housing 12 so as to allow easy operation thereof as if it were in a position similar to that shown in FIG. 9.

In the embodiment shown in FIG. 7, the housing 12 includes an antenna 44 which cooperates with additional components (not shown) placed within the housing to allow the micro computer to send and/or receive signals. The placement of the antenna 44 on the housing 12 may vary, as desired, while remaining within the spirit of the present invention.

In the embodiment shown in FIG. 8, the housing 12 has an accessory module in the form of an expanded battery or memory 38 or the like connected thereto. In this configuration, the accessory module adds to the axial width of the housing. It is to be understood however that the front portion 26 of the lower surface 16 may, if desired, be expanded to correspondingly increase the axial width of the housing so as to maintain a generally planar surface for the housing 12 or, if desired, may be expanded independent of the shape of the housing. It is to be understood that the removable portion 34 of the housing 12 is intended to accommodate a wide variety of accessory modules and is not intended to be limited by the examples set forth above. For instance, a phone and/or pager accessory module may also be added and/or a printer capable of printing forms or the like may also be connected to the housing.

These features may also be readily incorporated by means of a thicker or deeper lower surface 16' as shown in the embodiment illustrated in FIG. 9. The thicker lower surface 16' provides additional room within the cavities 25 and 31, thereby obviating the need for an accessory module. It is to be understood however, that if desired, an accessory module may also still be incorporated into the thicker lower surface 16'

Figure 10:
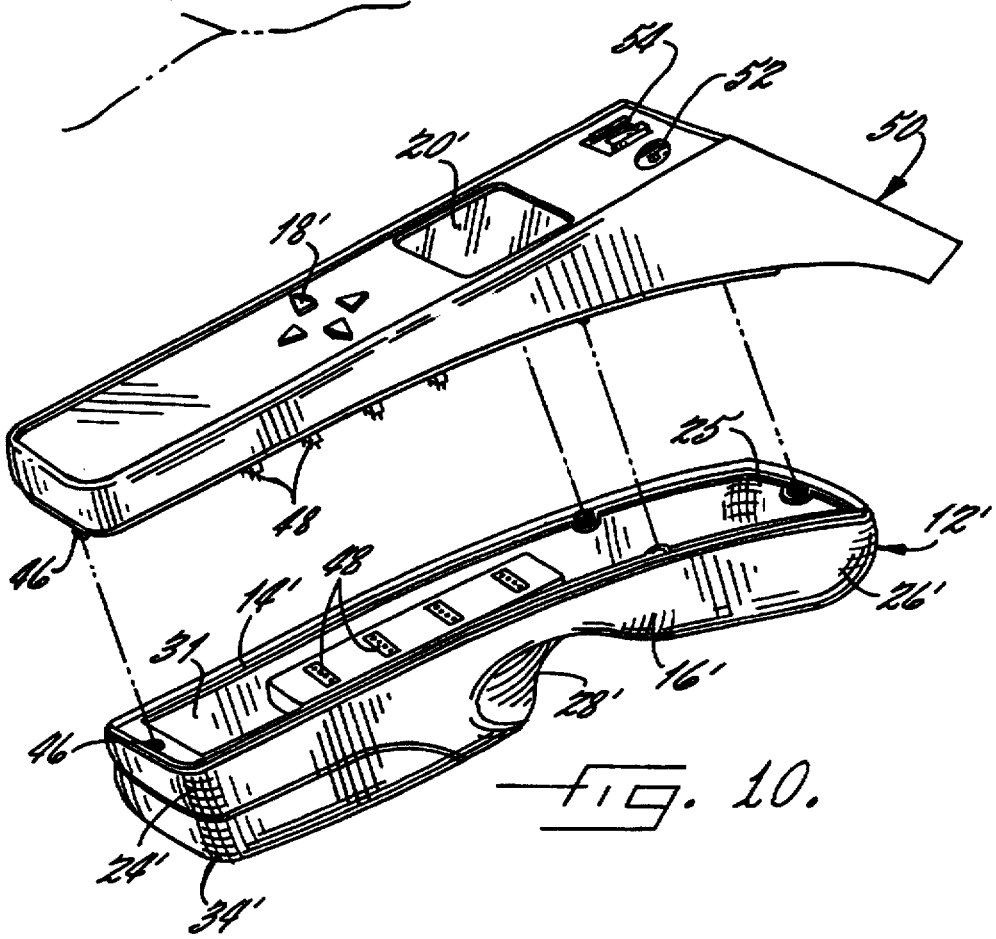
FIG. 10 is a side view in perspective of a housing according to an alternative embodiment of the invention.

In the embodiment shown in FIG. 10, the housing 12' has an upper surface 14' and a lower surface 16'. The lower surface 16' has the same general shape as that disclosed above with reference to FIGS. 1 through 4. The upper surface 14' of the present embodiment allows access of a mechanical interface 46, such as heat stakes, screws, or other conventional fastener, and/or an electrical interface 48, such as electrical connectors, to be connected to the housing 12'. These interfaces allow another component such as an electronic wand 50, having an activation switch 18' and a display 20', to be connected thereto and cooperate therewith. In addition, the wand 50 may have a mechanical connector 52 and/or an electrical connector 54 attached thereto to receive additional components which may be used with the housing 12'. This embodiment is intended to accommodate the connection of existing micro computers or the like with the housing 12' to obtain the advantages provided by the present invention.

In each embodiment of the housing 12 disclosed herein, the edges of the housing have been rounded to make the interaction with an operator's hand more comfortable. It is to be understood however that other than those elements discussed herein which are important to the present invention, the shape of the overall design of the housing 12 may vary greatly and still remain within the spirit of the invention. The housing 12 may also have a textured or treated surface to increase the friction or tackiness thereof to improve the comfort of the housing. It is also well within the spirit of the present invention to manufacture the housing from either a hard or soft material both of which can withstand shock or falls without damage.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed. Although specific terms are employed, they are used in a generic and descriptive sense only and not for purposes of limitation, and that modifications and embodiments are intended to be included within the scope of the appended claims.

What is claimed is:

1. An ergonomic housing for a micro computer comprising:
   an upper surface for positioning at least one interface component thereon; and
   a lower surface having a front portion and a rear portion defining therebetween a recessed finger saddle for receiving an operator's finger therein wherein said finger saddle has a generally U-shaped configuration defined by opposing sides of said housing wherein at least one of said sides of said housing is tapered at said generally U-shaped configuration, enabling said housing to be comfortably held in an operator's hand when the operator's hand is in its naturally relaxed position.

2. A housing according to claim 1 wherein said finger saddle comprises a channel separating said front portion and said rear portion of said housing and being generally perpendicular to a longitudinal axis thereof.

3. A housing according to claim 2 wherein said finger saddle comprises a generally U-shaped configuration, said finger saddle being sufficiently recessed to maintain said housing in position with respect to an operator's finger.

4. A housing according to claim 1 wherein said finger saddle has a generally U-shaped configuration generally perpendicular to the longitudinal axis of said housing, and a generally U-shaped configuration in a second direction generally parallel to the longitudinal axis of said housing conforming to the natural contour of an operator's relaxed finger to thereby limit unwanted relative movement between the finger positioned therein and said housing when said housing is held in an operator's hand.

5. A housing according to claim 1 wherein at least one of said front portion and said rear portion include a generally planar lower surface forming a base enabling said housing to rest in a stable position on a substantially planar surface.

6. A housing according to claim 1 wherein said housing comprises a clam-shell configuration.

7. A housing according to claim 1 wherein one of said interface components comprises an activation switch for the micro computer.

8. A housing according to claim 1 wherein one of said interface components comprises an electrical interface for connecting electronic components thereto.

9. A housing according to claim 1 wherein one of said interface components comprises a mechanical interface for mechanically connecting a component thereto.

10. A housing according to claim 1 further comprising an activation switch positioned on said upper surface in general axial alignment with said finger saddle so as to allow activation of said activation switch by natural movement of an operator's thumb.

11. A housing according to claim 1 further comprising an activation switch positioned on said lower surface within said finger saddle so as to allow activation of said activation switch by natural movement of an operator's finger within said finger saddle.

12. A housing according to claim 1 wherein said finger saddle is positioned adjacent a center portion of said housing so as to receive an operator's finger.

13. A housing according to claim 1 further comprising at least a pair of generally parallel finger saddles located intermediate said front portion and said rear portion along said lower surface of said housing.

14. A housing according to claim 1 wherein said upper surface comprises a generally planar configuration.

15. A housing according to claim 1 further comprising an aperture defined in said front portion at a downwardly diverging angle transverse to the longitudinal axis of said housing.

16. A housing according to claim 15 wherein said aperture is recessed within said housing.

17. A housing according to claim 15 wherein said downwardly diverging angle approaches 45° from the horizontal.

18. A housing according to claim 1 further comprising a display located on said upper surface.

19. A housing according to claim 1 further comprising a keypad located on said upper surface.

20. A housing according to claim 1 further comprising a selectively interchangeable accessory module connected to said housing.

21. A housing according to claim 20 wherein said accessory module comprises an expanded memory.

22. A housing according to claim 20 wherein said accessory module comprises a pistol grip.

23. A housing according to claim 20 wherein said accessory module comprises an auxiliary battery.

24. A housing according to claim 20 wherein said accessory module comprises an expanded keypad.

25. A housing according to claim 1 wherein said front portion of said upper surface and said lower surface cooperatively comprise a bulbous configuration enabling said housing to easily be guided into one of a pocket and a holster and providing an unobstructed view of a desired target.

26. A housing according to claim 1 wherein said upper surface further comprises a peripheral rib defining a recess for protectively retaining at least one of a display and said at least one interactive component.

27. A housing according to claim 1 wherein said upper surface further comprises a thumb rest for retaining an operator's thumb adjacent said at least one interface component.

28. A housing according to claim 1 wherein said finger saddle has a generally U-shaped configuration in a direction generally parallel to the longitudinal axis of said housing.

29. A housing according to claim 1 wherein said finger saddle has a generally U-shaped configuration in a direction generally perpendicular to the longitudinal axis of said housing.

30. A housing according to claim 29 wherein a generally U-shaped configuration of said finger saddle extends in a direction angularly oriented relative to the longitudinal axis of said housing.

31. A housing according to claim 1 wherein said generally U-shaped configuration of said finger saddle is defined between opposing side surfaces of said housing, in a direction generally parallel to the longitudinal axis of said housing.

32. An ergonomic housing for a micro computer comprising:
   an upper surface for positioning at least one interface component thereon;
   a lower surface having a front portion and a rear portion defining therebetween a recessed finger saddle for receiving an operator's finger therein; and
   a pair of side surfaces each having a front portion and a rear portion also defining therebetween said recessed finger saddle, said side surfaces extending between said upper and lower surfaces, wherein said rear portion and front portion of at least one of said side surfaces define said finger saddle which has a generally U-shaped configuration and wherein the rear portion of the at least one side surface includes a beveled portion which extends within said finger saddle, conforming to the natural contour of an operator's relaxed finger, enabling said housing to be comfortably held in an operator's hand when the operator's hand is in its naturally relaxed position.

33. A housing according to claim 32 wherein said generally U-shaped configuration extends in a direction angularly oriented relative to the longitudinal axis of said housing.

34. A housing according to claim 32 wherein said finger saddle extends substantially across said lower surface of said housing.

35. An ergonomic housing for a micro computer comprising:

an upper surface for positioning at least one interface component thereon; and a lower surface having a front portion and a rear portion defining therebetween a recessed finger saddle for receiving an operator's finger therein wherein said finger saddle has a generally U-shaped configuration in a first direction generally perpendicular to the longitudinal axis of said housing, and a generally U-shaped configuration in a second direction generally parallel to the longitudinal axis of said housing, said finger saddle having a concave portion facing said rear portion, conforming to the natural contour of an operator's relaxed finger, enabling said housing to be comfortably held in an operator's hand when the operator's hand is in its naturally relaxed position.

36. A housing according to claim 35 wherein said finger saddle extends substantially across said lower surface of said housing.

37. An ergonomic housing for a micro computer comprising:

an upper surface for positioning at least one interface component thereon; and a lower surface having a front portion and a rear portion defining therebetween a recessed finger saddle having a generally U-shaped configuration in a direction generally parallel to the longitudinal axis of said housing configured to receive and substantially encompass an operator's finger therein, a portion of said upper surface opposite said generally U-shaped configuration being generally planar, said generally U-shaped configuration enabling said housing to perch on the operator's finger when said housing is held within an angle of between 0° and 50° from the horizontal, and thereby allowing the operation of said at least one interface component without requiring the housing to be firmly squeezed by the remaining fingers of the operator's hand.

38. An ergonomic housing for a micro computer comprising:

an upper surface;

a lower surface having a front portion and a rear portion defining therebetween a recessed finger saddle for receiving an operator's finger therein, wherein said finger saddle has a generally U-shaped configuration defined by opposing side surfaces of said housing, in a direction generally parallel to the longitudinal axis of said housing wherein at least one of said sides of said housing is tapered at said generally U-shaped configuration conforming to the natural contour of an operator's relaxed finger, enabling said housing to be comfortably held in an operator's hand when the operator's hand is in its naturally relaxed position; and a removable portion for selectively receiving an accessory module.

39. A housing according to claim 38 wherein said finger saddle comprises a channel bisecting said front portion and said rear portion of said housing generally perpendicular to a longitudinal axis thereof.

40. A housing according to claim 39 wherein said finger saddle comprises a generally U-shaped configuration, said finger saddle being sufficiently recessed to maintain said housing in position with respect to an operator's finger.

41. A housing according to claim 38 wherein said finger saddle also has a generally U-shaped configuration generally perpendicular to the longitudinal axis of said housing conforming to the natural contour of an operator's relaxed finger to thereby limit unwanted relative movement of between the finger positioned therein and said housing when said housing is held in an operator's hand.

42. A housing according to claim 38 wherein at least one of said front portion and said rear portion include a generally planar lower surface forming a base enabling said housing to rest in a stable position on a substantially planar surface.

43. A housing according to claim 38 wherein said housing comprises a clam-shell configuration at least including a top cover and a bottom cover.

44. A housing according to claim 38 further comprising an interface component on said upper surface.

45. A housing according to claim 44 wherein said interface component comprises an activation switch for the micro computer.

46. A housing according to claim 44 wherein said interface component comprises an electrical interface.

47. A housing according to claim 44 wherein said interface component comprises a mechanical interface.

48. A housing according to claim 38 further comprising at least a pair of generally parallel finger saddles located intermediate said front portion and said rear portion along said lower surface of said housing.

49. A housing according to claim 38 further comprising an aperture defined in said front portion at a downwardly diverging angle transverse to the longitudinal axis of said housing.

50. A housing according to claim 38 wherein said accessory module comprises an expanded memory.

51. A housing according to claim 38 wherein said accessory module comprises a pistol grip.

52. A housing according to claim 38 wherein said accessory module comprises an auxiliary battery.

53. A housing according to claim 38 wherein said accessory module comprises an expanded keypad.

54. Ergonomic housing for a micro computer comprising:

an upper surface;

a lower surface having a front portion and a rear portion defining therebetween a recessed finger saddle having a generally U-shaped configuration in a first direction generally perpendicular to a longitudinal axis of said housing, and a generally U-shaped configuration in a second direction generally parallel to the longitudinal axis of said housing wherein a concave portion of said generally U-shared configuration faces said rear portion, for receiving therein an operator's finger, enabling said housing to be comfortably held in an operator's hand when the operator's hand is in its naturally relaxed position; and an aperture defined in said front portion at a downwardly diverging angle transverse to the longitudinal axis of said housing to enable interaction of the micro computer with a desired target with minimal movement of an operator's hand.

55. A housing according to claim 54 wherein said accessory module comprises a pistol grip.

56. A housing according to claim 44 wherein said accessory module comprises an auxiliary battery.

57. A housing according to claim 53 wherein said accessory module comprises an expanded keypad.

58. A housing according to claim 53 wherein said finger saddle comprises a channel bisecting said front portion and said rear portion of said housing generally perpendicular to a longitudinal axis thereof.

59. A housing according to claim 58 wherein said finger saddle comprises a generally U-shaped configuration, said finger saddle being sufficiently recessed to maintain said housing in position with respect to an operator's finger.

60. A housing according to claim 54 further comprising a removable portion for receiving a selectively interchangeable accessory module.

61. A housing according to claim 60 wherein said accessory module comprises an expanded memory.

62. A housing according to claim 60 wherein at least one of said front portion and said rear portion include a generally planar lower surface forming a base enabling said housing to rest in a stable position on a substantially planar surface.

63. A housing according to claim 60 wherein said housing comprising a clam-shell configuration.

64. A housing according to claim 45 wherein said downwardly diverging angle approaches 45° from the horizontal.

65. A housing according to claim 60 further comprising an interface component on said upper surface.

66. A housing according to claim 65 wherein said interface component comprises an activation switch for the micro computer.

67. A housing according to claim 66 wherein said interface component comprises an electrical interface.

68. A housing according to claim 66 wherein said interface component comprises a mechanical interface.

* * * * *

UNITED STATES PATENT AND TRADEMARK OFFICE
CERTIFICATE OF CORRECTION

PATENT NO. : 5,801,918
DATED : September 1, 1998
INVENTOR(S) : Ahearn et al.

It is certified that error appears in the above-identified patent and that said Letters Patent is hereby corrected as shown below:

Column 15, line 8, "claim 44" should be --claim 54--; line 10, "claim 53" should be --claim 54--; line 12, "claim 53" should be --claim 54--.

Column 16, line 9, "claim 45" should be --claim 60--; line 16, "claim 66" should be --claim 65--; line 18, "claim 66" should be --claim 65--.

In the References Cited, FOREIGN PATENT DOCUMENTS, line 4, "10/1995" should be --10/1985--.

Column 14, line 63, "U-shared" should be --U-shaped--.

Signed and Sealed this

Eighth Day of December, 1998

*Attest:*

BRUCE LEHMAN

*Attesting Officer*  *Commissioner of Patents and Trademarks*